United States Patent [19]

Ross, Jr.

[11] 4,342,480
[45] Aug. 3, 1982

[54] TARP ENCLOSURE FOR FLAT BED TRAILER AND TRUCK BODIES

[76] Inventor: Leonard W. Ross, Jr., 10902 Huntcliff Dr., Owings Mills, Md. 21117

[21] Appl. No.: 181,421

[22] Filed: Aug. 26, 1980

[51] Int. Cl.³ .................................................. B60P 7/02
[52] U.S. Cl. ..................................... 296/100; 296/105
[58] Field of Search ............... 296/100, 102, 104, 105, 296/109; 135/7.1 A, 5 A, 4 A, 3 A, 1 A

[56] References Cited

U.S. PATENT DOCUMENTS

| | | | |
|---|---|---|---|
| 2,807,499 | 9/1957 | Duddleston | 296/100 |
| 3,363,938 | 1/1968 | Schultz | 296/105 |
| 3,481,645 | 12/1969 | Stepp | 296/105 |
| 3,688,787 | 9/1972 | Feather | 296/105 |
| 3,901,548 | 8/1975 | Seaman, Jr. | 296/100 |

FOREIGN PATENT DOCUMENTS

| | | | |
|---|---|---|---|
| 860189 | 1/1971 | Canada | 296/105 |
| 678447 | 12/1964 | Italy | 296/100 |
| 361487 | 5/1962 | Switzerland | 296/105 |
| 303683 | 1/1929 | United Kingdom | 296/105 |

Primary Examiner—Joseph F. Peters, Jr.
Assistant Examiner—Ross Weaver
Attorney, Agent, or Firm—John F. McClellan, Sr.

[57] ABSTRACT

An improved, easy installation mechanized enclosure system for flatbed trailers and the like has anti-jamming roller bearing inclined ends on a succession of canopy-supporting arcuate members or roof-bows with rollers running in over-and-under tracks; the incline both increases the effective distance between rollers on each end of the arcuate members and loosens installation tolerances and immunizes against damage caused by misalignment of the tracks for the rollers by making it practically impossible for changes in spacing between the tracks to alter smooth operation of the rollers; other advantages of the system, some optional, include provisions for full-bed access for loading and unloading, both power and manual operation, integral lower-roller axles, roof bow tautening arm-braces, snapon/snap off installation of tarpaulin on roof bows, and spring-biased roller latches.

11 Claims, 7 Drawing Figures

TARP ENCLOSURE FOR FLAT BED TRAILER AND TRUCK BODIES

This invention relates generally to enclosures and particularly to extensible-retractable enclosures for vehicle beds and the like.

A principal object of this invention is to provide an improved enclosure system for vehicle beds and the like.

In the prior art various enclosures have been disclosed, including those in the following U.S. Pat. Nos.

2,807,499 issued to K. H. Duddleston, Sept. 24, 1957, discloses a tarpaulin cover which is fixed at the front of the vehicle bed and which can be deployed rearward over the load by compressed air acting to expand collapsible conduits; side flanges or guides are used to hold the edges and retraction is by rubber strips;

3,298,732 issued to A. N. Openshaw, Jan. 17, 1967, discloses a cable-deployed cover for a vehicle bed; winding of cable on a spool retracts the cover also; over-and-under side tracks are used, each canvas bow or gable member has two inward extending rollers to engage these;

3,416,835 issued to H. F. Ohle, Dec. 11, 1968, discloses a folding panel cover operable by power to extend and retract over a vehicle bed;

3,488,087 issued to A. E. Cox, Jan. 6, 1970, discloses aluminum panel vehicle bed cover structure;

3,709,552 issued to E. G. Broadbent, Jan. 9, 1973, discloses a guided retractable side curtain for vehicle load protection; upper and lower edge engagement is provided for holding and tensioning;

3,759,568 issued to C. Unruh, Sept. 18, 1973, discloses a reel-wound-shut load cover extensible and retractable;

4,032,186 issued to P. A. Pickering and H. W. Pickering, June 28, 1977, discloses a cable-deployed, retracted and supported flexible cover for a vehicle bed.

However, it is believed that the prior art fails to provide the advantages of the present invention as set out in the objects of this invention, further objects being:

to provide an enclosure system of the type described which can be bought in kit form and quickly and easily installed by the user on trailers, trucks and the like, primarily flat bed semi-trailers but not limited to them, with minimum labor and modification and skill required;

to provide a system as described which can cover and uncover cargo at the touch of a button and which provides for optional manual operation;

to provide a system as described which is substantially as to track alignment, jam free, and is quick and reliable in operation;

to provide a system as described which is flexibly adaptable to fit a variety of sizes, which can provide loading and unloading clearance for the full length of the vehicle on which installed, and which is lightweight and economical to purchase and to use.

In brief summary given as cursive description only and not as limitation, the invention includes a tubular-bellows-extensible canopy, carried on a plurality of arcuate members rolling on over and under tracks and having inclined roller carrying lower ends; and means for retracting the canopy; in an embodiment forward stowage of the canopy provides clear side access for loading and unloading the entire length of a trailer bed.

The above objects and advantages of the invention will become more readily understood on examination of the following description, including the drawings, in which like reference numerals refer to like parts:

FIG. 1 shows the invention in a first embodiment 10, installed on a conventional forty-foot flat bed semi-trailer T (shown detached from a tractor and in loading configuration).

Figure 1:
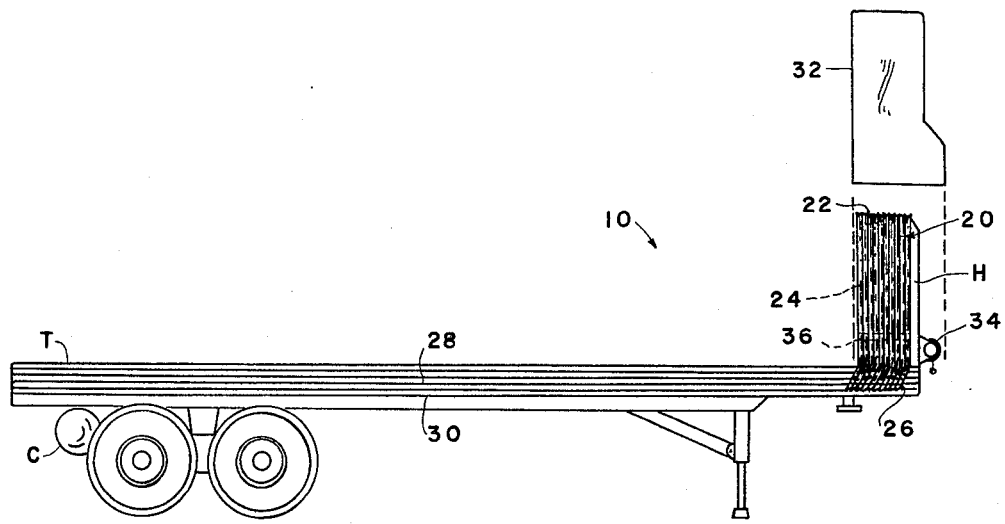
FIG. 1 is a side elevational diagram of the invention on a vehicle in retracted position.

Enclosure or canopy assembly 20 is retracted toward the front of the trailer, where it rests against the trailer headboard H, to which the forward edge of the enclosure attaches, providing clearance along most of the length of the trailer for loading by forklift or by crane.

The canopy 22 of the enclosure is supported by a series of roof bows 24 having lower ends 26 extending down and supported by longitudinal tracks on each side of the trailer, 28, 30 being indicated on the near side. To protect the canopy from the elements when retracted, a fabric boot 32 having closed top and sides and open bottom can be slipped over it. The boot can cover winch 34 also. The purpose of the winch is explained in relation to the next Figure.

To cover the trailer to protect any cargo carried from the weather the operator merely has to press a button admitting compressed air as from a tank C to a collapsed tubular bellows 36 one of which is supplied on each side of the trailer.

Figure 2:
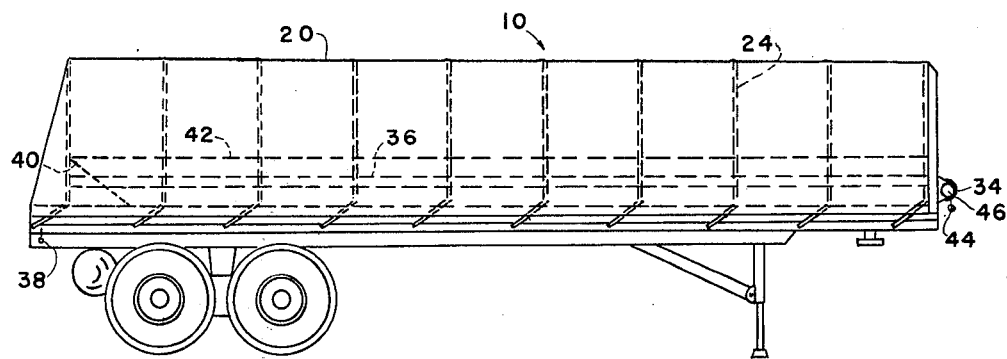
FIG. 2 is a similar diagram with the invention in extended position.

FIG. 2 shows the result of admitting air to the pair of bellows (36 indicated in broken lines). At the touch of a button the canopy assembly extends rearwardly as a tunnel, supported on the top bows which roll along the tracks on each side. At the fully extended position a latch 38 automatically secures the rear of the enclosure assembly 20 from rolling forward when the air supply is shut off, and an arm-brace 40 can be used to stretch the canopy tight; both as explained in reference to later Figures. Spacing of the roof bows 24 may be from 3 to 5 feet (90 to 150 cm) on centers as a practical distance with above-bed heights of 6 to 10 feet (180 to 300 cm).

When it is desired to retract the canopy forwardly again, winch 34 fixed on the front of the headboard can be used to reel in a pair of lines (42 indicated on the near side and a similar line being on the far side).

The lines are secured at the rear end to the rearmost roof bow and draw it to the front when the winch is actuated, either by crank 44 or at the touch of another button by a preferable option, a conventional air motor 46 attached to turn the winch in conventional manner.

Figure 3:
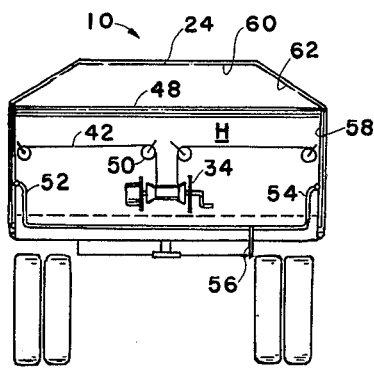
FIG. 3 is a front end elevational diagram.

FIG. 3 shows the relations of the parts of the enclosure system embodiment 10 which appear in this front elevational diagram.

Shown rolled up here is an optional flap 48 which may be integral with the canopy at the forward bow and may be pulled forward of the headboard H and zipped to the canopy down the sides to shield the front end, including the winch 34, lines 42 and pulleys 50 for the lines, and the air lines 52, 54, 56.

The roof bows are substantially identical downwardly concave arcuate members, preferably having parallel standards 58, or upright portions at the respective sides in this view, and integrally joined across the tops of the standards by a horizontal portion 60 with a downward outwardly inclined portion 62 at each end of the horizontal portion.

Figure 4:
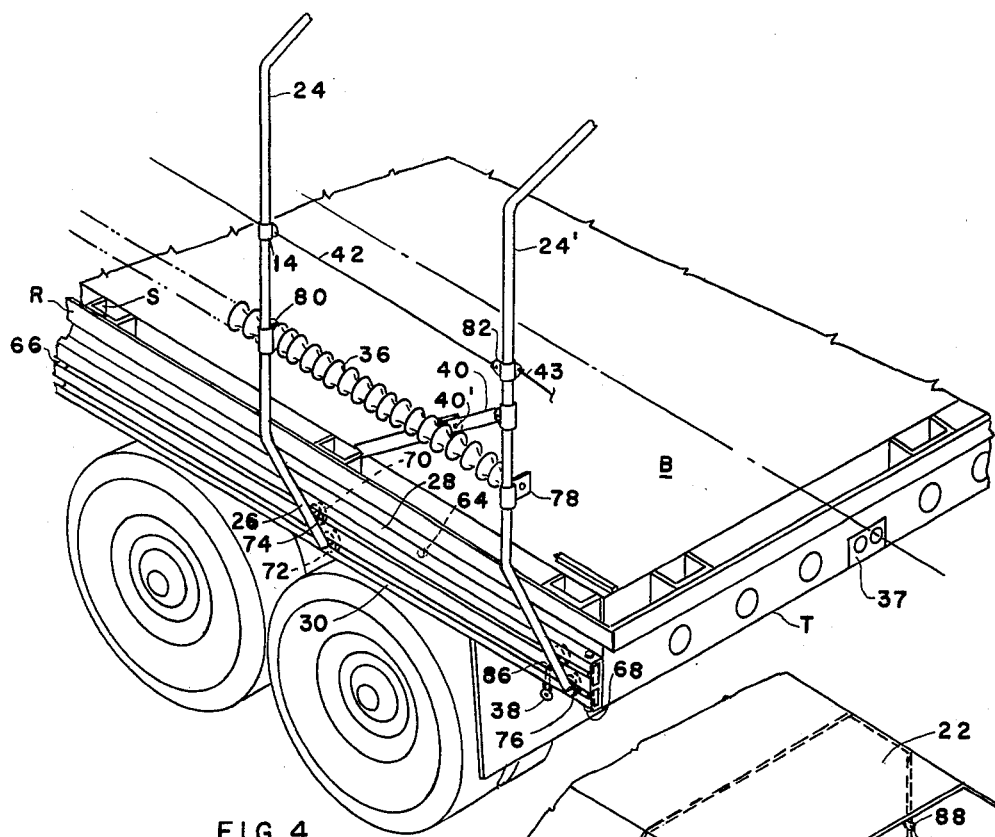
FIG. 4 is a rear quarter perspective detail.

FIG. 4 shows an enlarged detail of the relation of the roof bows 24, 24'; tracks 28, 30, bellows 36 and pushbutton valve control 37 for same, retraction lines 42, and fragmentarily shown similar extension lines 43 which may be pulled from the rear manually for centered urging if desired, one being on each side, and arm braces 40 with "locking" elbow pivoting at 40', to the customary flat bed trailer T on which they are installed and which has customary side rails R and stake holders S.

Beginning at about three inches below the usual side rail R and parallel with it along the edge of the flat bed B of the trailer T the first and second tracks 28, 30 are affixed in over-and-under relation as by screws 64 passing through predrilled holes in the tracks. The tracks have the cross-sectional shape of a square "C" with the open portion of the section disposed outboard as a slot 66. Dimensions of the tracks may be 1¾ in., (4.3 cm) deep by 2¼ in. (5.6 cm) high, with the slots 1 3/16 in. (1.8 cm) wide. Material may be ⅛ inch (0.3 cm) thick steel. The tracks need not be but may be in contact along the track lengths. At the rear and similarly at the front and not shown here, a machine screw 68 or bolt is run through the lower track to act as a roller stop.

The upper rollers or first rollers 70 may substantially fill the upper track in section forming a running fit in it, and the lower or second rollers 72 similarly fit the lower track. Respective upper and lower axles 74, 76 integral with the lower portions of the roof bows rotationally mount the rollers to the roof bows. In each case the lower axle may comprise the integral inwardly bent lower end of each roof bow, simplifying and strengthening the assembly. This lightens the weight as compared with some types of axle attachment. The roof bows may be made of three-quarter inch (1.8 cm) diameter steel tubing with wall thickness 1/16 inch (15 cm) or thicker, depending on span and height.

In accordance with an important provision of the invention, each lower end portion 26 of the roof bows inclines at an angle to the upright portion above it, so that the corresponding upper and lower rollers 70,72 are not one-above-the-other, but instead are offset in a fore-and-aft direction.

The incline angle from the upright portion must be sufficient to prevent the rollers from jamming when the roof bows are urged along the trailer bed in either direction. According to this invention, at least sufficient separation of the rollers to prevent two-direction cramping of the upper and lower rollers on the track portion between them prevents jamming.

It can be seen that if the rollers were in vertical relation a force urging an intermediate portion of a roof bow to the front or to the rear would tend to reduce the effective vertical spacing of the rollers and cause them to grip the track portion between them, with the grip tightening in proportion to force, in either direction. Such jamming tendency would require heavier roof bow structure to withstand forces of extension and retraction and would require more critical vertical positioning of the urging means to balance out roller friction and canopy positioning.

Preferably the incline is downward to the rear. This provides desirable forward offset of the upper parts of the bows, which in storage or retracted position gives better clearance at the headboard loading of the trailer, as by a fork lift. To accentuate this effect, the inclined portion may commence at a level above the upper roller axle, but below the level of the trailer bed surface for least interference with access to the load.

Angle of incline may be thirty degrees as an example providing desirable offset with the upright portions of the roof bows. It can be seen that with such incline, altering the vertical angle of the upright portion by wrenching on it, or even installation of the tracks in a diverging or a curved relation to each other will not prevent proper and smooth operation because the center-to-center distance of the over-and-under rollers is not critical and can vary along the tracks without a problem. This tolerance makes it more practical for truck or tractor trailer operators to purchase the invention in kit form and install it themselves even though they may not have experience in such work.

A conventionally spring-biased plunger latch 38, with a forward bevel 86 on the upper end of the sliding portion, which protrudes into the lower track 30 from below, automatically captures the lower rollers of the rearmost roof bow in the fully extended position, from which a ring handle on the lower end when pulled down causes the rollers to be released when desired.

Arm brace 40 which pivots to a bracket on the rearmost roof bow may reach forward to trailer structure when unfolded at over-center-locking elbow pivotal joint 40' and brace the rearmost roof bow to tauten the canopy by thrust of the "V" shaped free end of the arm brace against the trailer when the arm brace is straightened.

The bellows 36 may be of conventional high-pressure air-brake line plastic tubing material such as flexible polystyrene high density polyethylene or the like, with diameter suitable for load and pressure. A three-inch diameter end-area with only twenty pounds per square inch of air pressure will produce a canopy driving force on each side of the trailer of 180 lb. (80 kg).

To harness the force for extending the canopy by moving rearwardly the roof bows in spaced array, the rear end of the bellows 36 may be connected to the rearmost roof bow 24' by a conventional bracket 78 sandwiching the closed-end convolution securely, or otherwise conventionally fastening it at a height intermediate the length of the upright portion of the roof bow clear of the side rails so that chain-access is not blocked. Air access is by conventional nipple at the forward end.

The bellows may be secured to the headboard of the trailer by a similar bracket. Each of the other roof bows may have a bellows connection by means of a tie 80 securing the bellows to a bracket in conventional manner, so that every roof bow is driven in proper spacing when the canopy is being extended.

For retracting the canopy, a respective one of the lines 42 is attached on each side of the rear roof-bow at a suitable bracket 82 which may be above the bellows. A fairlead 14 may be provided on each of the other roof bows and on the headboard to guide the line to the winch when retracted by the winch, and to prevent tangles when the canopy is extended.

Figure 5:
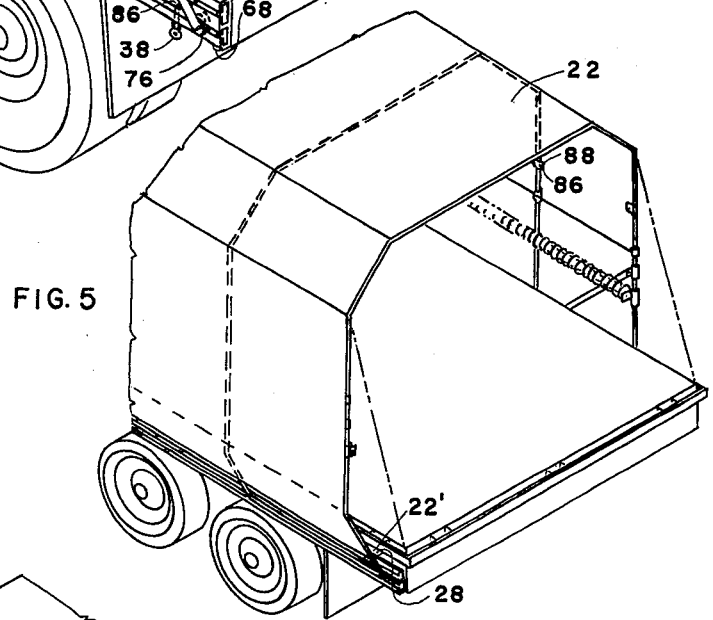
FIG. 5 is a rear quarter perspective detail.

FIG. 5 shows the relations of the canopy 22 to parts just described. The canopy may have any conventional seal at the skirt, such as an inward-turned portion 22' which may be over the first track 28.

Snaps 86 on return flaps 88 sewn to the canopy may secure it to the roof bows at appropriate locations and other similar snaps around the rear opening may provide means for securing the canopy to a rear-end cover, not shown, in conventional manner. Similar securance may be used at the front if desired.

The canopy 22 is preferably of lightweight pleated material such as rubberized "Nylon" which will fold into accordian pleats when drawn forward to the retracted position. Some "Kodak" camera bellows have similar configuration and fold uniformly.

Figure 6:
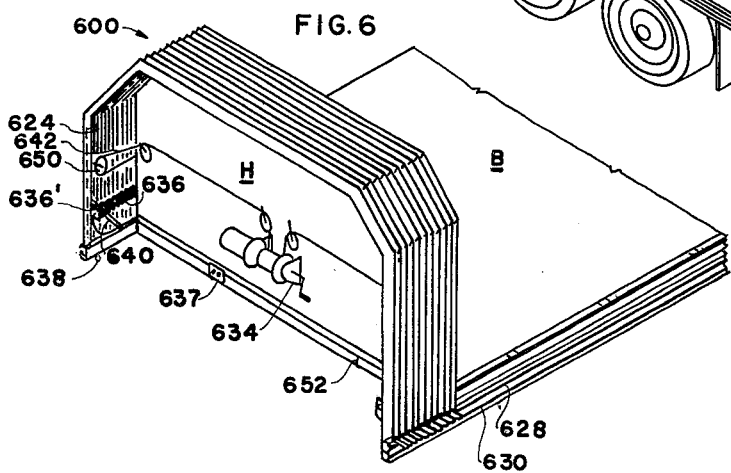
FIG. 6 is a front quarter perspective view of an optional embodiment.

FIG. 6 shows an optional embodiment 600 of the invention, which positively clears all the bed B of the vehicle T on which the invention is installed so that the entire bed on all sides and from overhead can be accessible for loading, when desired.

For this provision, the tracks 628, 630 are supplied longer than the trailer bed (whether abutted or integral tracks or sawed-on-installation tracks are used does not matter) and installed to project on each side forward of the headboard H (or other limiting front member where practical) of the particular vehicle a distance equal to the to-be-stored length of the canopy assembly when retracted.

The frontmost roof bow 624 may be permanently fixed at the forward end as by roller latches 638, and by arm braces 640 attached to the upper track, but otherwise similar to those described for the rear, and the bellows 636 and lines 642 may be attached to (650 is a pulley for the lines and 636' a bellows connection) and react against it as though it were the headboard. For this, the tracks may be conventionally shimmed-out to provide clearance along the sides of the headboard, if desired, or the headboard may be substituted or otherwise narrowed.

In this optional embodiment the winch 634 preferably with conventional hand crank and air motor both, may be fixed to the headboard H, and the air line 652 from any conventional source such as the air-brake tank may lead to the forward end plates of the bellows by way of a conventional manual release valve 637 on the headboard to vent the bellows for retraction. A similarly located conventional winch ratchet release permits line to be drawn off the winch on extension of the canopy.

It will be appreciated that the economization by the small bellows of air use from the air brake supply tank greatly improves in reliability and preserves simplicity.

Figure 7:
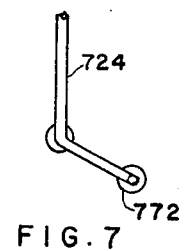
FIG. 7 shows an elevational detail of an alternative roller attachment.

FIG. 7 shows the optional detail that the roof bows 724 may mount the upper roller at the angle if desired instead of below it.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for enclosing a trailer of the flat bed type and the like, with a canopy held by a plurality of arcuate members movably supported on over and under tracks fixed along each side of a trailer, said canopy pleated for folding upon retraction of the arcuate members toward a trailer headboard, the system having air powered means for actuating each of said arcuate members to move along said over-and-under tracks, on a respective roller engaging each of said over-and-under tracks, the improvement comprising in combination: means for preventing jamming of the rollers of respective arcuate members from misalignment of the over-and-under tracks relative to each other, comprising each of said respective arcuate members having: a substantially upright portion at each side and an inclined portion extending downwardly at an angle to each upright portion, said incline being in a fore-and-aft direction, said rollers being at said inclined portion, each of said over-and-under tracks having square-"C" shape in cross-section with the open portion of said square-"C" shape disposed outboard, a portion of each of said over-and-under tracks being between the rollers, the length of said incline being sufficient at least to increase the effective spacing of said rollers a distance preventing two-direction cramping of the rollers on said over-and-under track portion between the rollers, said air powered means comprising a respective tubular bellows extending rearwardly along the system on each side thereof, means attaching said tubular bellows to each of said respective arcuate members, means connecting said air powered means for inflating both said bellows together and extending said canopy to the rear and means for retracting said canopy including a winch for mounting at the front of a trailer, and a respective line extending rearwardly from the winch along each side of the system to connection with the rearmost arcuate member.

2. In a system as recited in claim 1, air power means for winding said winch, and a boot proportioned for fitting over the canopy when retracted and over said winch and over a said headboard of a trailer, said boot having a closed top and sides and an open bottom.

3. In a system as recited in claim 1, said incline of the inclined portion of the arcuate members being in a rearward direction.

4. In a system for enclosing a trailer of the flat bed type and the like, with a canopy held by a plurality of arcuate members movably supported on over-and-under tracks fixed along each side of a trailer, said canopy pleated for folding upon retraction of the arcuate members toward a trailer headboard, the system having air powered means for actuating arcuate members to move along said over-and-under tracks, on rollers engaging said over-and-under tracks, the improvement comprising in combination: means for preventing jamming of the rollers of respective arcuate members from misalignment of the over-and-under tracks relative to each other, comprising each of said respective arcuate members having: a substantially upright portion at each side, an inclined portion extending downwardly at an angle to the upright portion, said incline being in a fore-and-aft direction, said rollers being at said inclined portion, said incline of the inclined portion of the arcuate members being in a rearward direction, a portion of said over-and-under tracks being between the rollers, the length of said incline being sufficient at least to increase the effective spacing of said rollers a distance preventing two-direction cramping of the rollers on said track portion between the rollers, said over-and-under tracks being proportioned for extending ahead of a said trailer headboard a distance receiving in the retracted position all said upright portions of the arcuate members and said canopy, clearing the loading area of a said trailer.

5. In a system as recited in claim 4, and a boot with closed tops and sides and open bottom, the boot proportioned for fitting over all said retracted upright portions and canopy and a said trailer headboard.

6. In a system for enclosing a trailer of the flat bed type and the like, with a canopy held by a plurality of arcuate members movably supported on over-and-under tracks fixed along each side of a trailer, said canopy pleated for folding upon retraction of the arcuate members toward a trailer headboard, the system having air powered means for actuating arcuate members to move along said over-and-under tracks, on rollers engaging said over-and-under tracks, the improvement comprising in combination: means for preventing jamming of the rollers of respective arcuate members from misalignment of the over-and-under tracks relative to each other, comprising each of said respective arcuate members having: a substantially upright portion at each side, an inclined portion extending downwardly at an angle to the upright portion, said incline being in a fore-and-aft direction, said rollers being at said inclined portion, said incline of the inclined portion of the arcuate members being in a rearward direction, a portion of said over-and-under tracks being between the rollers, the length of said incline being sufficient at least to increase the effective spacing of said rollers a distance preventing two-direction cramping of the rollers on said track portion between the rollers, and the proportions of the arcuate members being such as to extend from an above-load position to below a customary side rail on a said trailer and provide clearance for use of customary chains and stakes on said trailer.

7. In a system as recited in claim 6, each of the over-and-under tracks having a slot therealong on the outer side.

8. In a system as recited in claim 7, the over-and-under tracks having a square-"C" shape in section retaining and protecting said rollers and defining said slots.

9. In a system as recited in claim 7, said over-and-under tracks on each side being in contact.

10. In a system as recited in claim 7, said over-and-under tracks having means for attaching to a trailer, comprising a series of holes longitudinally therealong.

11. In a system as recited in claim 1, a rearmost arcuate member having an arm brace thereon in position for engaging a portion of a said trailer and tautening said canopy, the arm brace being of the lockable-elbow type for folding and having pivotal connection at a first end to said arcuate member, and a "V" shape on a second end of the arm brace.

* * * * *